(12) United States Patent
Zhou et al.

(10) Patent No.: US 11,059,033 B2
(45) Date of Patent: Jul. 13, 2021

(54) CATALYST FOR CATALYTIC OXIDATION TREATMENT OF ORGANIC WASTEWATER, PREPARATION METHOD THEREOF, AND APPLICATION THEREOF

(71) Applicant: Wanhua Chemical Group Co., Ltd., Shandong (CN)

(72) Inventors: Bo Zhou, Shandong (CN); Hua Heng, Shandong (CN); Hongke Zhang, Shandong (CN); Liangjin Chen, Shandong (CN); Junjun Wang, Shandong (CN); Zhenlong Fan, Shandong (CN); Weiqi Hua, Shandong (CN)

(73) Assignee: Wanhua Chemical Group Co., Ltd.

( * ) Notice: Subject to any disclaimer, the term of this patent is extended or adjusted under 35 U.S.C. 154(b) by 40 days.

(21) Appl. No.: 16/327,665

(22) PCT Filed: Aug. 31, 2016

(86) PCT No.: PCT/CN2016/097624
§ 371 (c)(1),
(2) Date: Feb. 22, 2019

(87) PCT Pub. No.: WO2018/035882
PCT Pub. Date: Mar. 1, 2018

(65) Prior Publication Data
US 2019/0193059 A1 Jun. 27, 2019

(30) Foreign Application Priority Data
Aug. 25, 2016 (CN) .......................... 201610719105.1

(51) Int. Cl.
| | | |
|---|---|---|
| *B01J 21/04* | (2006.01) | |
| *B01J 23/00* | (2006.01) | |
| *B01J 23/34* | (2006.01) | |
| *B01J 23/889* | (2006.01) | |
| *B01J 35/00* | (2006.01) | |
| *B01J 35/02* | (2006.01) | |
| *B01J 35/08* | (2006.01) | |
| *B01J 35/10* | (2006.01) | |
| *B01J 37/02* | (2006.01) | |
| *B01J 37/08* | (2006.01) | |
| *C02F 1/44* | (2006.01) | |
| *C02F 1/72* | (2006.01) | |
| *C02F 1/76* | (2006.01) | |
| *B01J 23/10* | (2006.01) | |
| *C02F 101/12* | (2006.01) | |
| *C02F 101/30* | (2006.01) | |

(52) U.S. Cl.
CPC .......... *B01J 23/8892* (2013.01); *B01J 21/04* (2013.01); *B01J 23/10* (2013.01); *B01J 23/34* (2013.01); *B01J 23/889* (2013.01); *B01J 35/0026* (2013.01); *B01J 35/023* (2013.01); *B01J 35/08* (2013.01); *B01J 35/1019* (2013.01); *B01J 35/1047* (2013.01); *B01J 35/1066* (2013.01); *B01J 37/0205* (2013.01); *B01J 37/0207* (2013.01); *B01J 37/0236* (2013.01); *B01J 37/08* (2013.01); *C02F 1/725* (2013.01); *C02F 1/76* (2013.01); *C02F 1/441* (2013.01); *C02F 2101/12* (2013.01); *C02F 2101/30* (2013.01); *C02F 2305/023* (2013.01)

(58) Field of Classification Search
CPC . B01J 23/002; B01J 23/10; B01J 23/34; B01J 23/889; B01J 23/8892; B01J 35/0013; B01J 35/0026; B01J 35/023; B01J 35/08; B01J 35/1019; B01J 35/1047; B01J 35/1066; B01J 37/0201; B01J 37/0205; B01J 37/0207; B01J 37/0236; B01J 37/08; B01J 37/088; B01J 2523/00; C02F 1/441; C02F 1/725; C02F 1/76; C02F 2101/12; C02F 2101/30; C02F 2305/023
See application file for complete search history.

(56) References Cited

U.S. PATENT DOCUMENTS

| | | | |
|---|---|---|---|
| 4,297,333 | A | 10/1981 | Crawford et al. |
| 4,430,315 | A | 2/1984 | Caldwell |
| 5,039,429 | A | 8/1991 | Laundon et al. |
| 5,041,408 | A | 8/1991 | King et al. |

FOREIGN PATENT DOCUMENTS

| | | |
|---|---|---|
| CN | 101844828 B | 12/2011 |
| CN | 102626636 A | 8/2012 |
| CN | 102698770 A | 10/2012 |
| CN | 103801297 A | 5/2014 |
| CN | 203639281 U | 6/2014 |
| CN | 102886268 B | 7/2014 |
| CN | 104549316 A | 4/2015 |
| CN | 105198131 A | 12/2015 |
| CN | 105731629 A | 7/2016 |
| CN | 105753133 A | 7/2016 |
| JP | 2010069457 A | 4/2010 |
| WO | 2015020005 A1 | 2/2015 |

OTHER PUBLICATIONS

Machine translation of CN 10-5753133A to Qiao et al. (2016) (obtained from Google Patents May 2020) (Year: 2016).*

(Continued)

*Primary Examiner* — Lucas A Stelling
(74) *Attorney, Agent, or Firm* — Lerner, David, Littenberg, Krumholz & Mentlik, LLP

(57) ABSTRACT

A catalyst for catalytic oxidation treatment of organic wastewater, comprising aluminum oxide, and nickel, ferrum, manganese, and cerium supported on the aluminum oxide in oxide form. Based on the weight of aluminum oxide, the contents of the following components in the catalyst are: nickel: 5.0-20 wt %; ferrum: 0.5-5.5 wt %; manganese: 0.5-3.5 wt %; and cerium: 1.5-3.0 wt %. The present invention has a good effect in catalytic oxidation for degrading COD organic pollutants in wastewater and has high reactivity.

16 Claims, No Drawings

(56) References Cited

OTHER PUBLICATIONS

Office Action from the Hungarian Intellectual Property Office (HIPO) dated Jul. 15, 2019.
International Search Report PCT/CN2016/097624, dated Jun. 8, 2017.

* cited by examiner

CATALYST FOR CATALYTIC OXIDATION TREATMENT OF ORGANIC WASTEWATER, PREPARATION METHOD THEREOF, AND APPLICATION THEREOF

CROSS REFERENCE TO RELATED APPLICATIONS

The present application is a national phase entry under 35 U.S.C. § 371 of International Application No. PCT/CN2016/097624, filed Aug. 31, 2016, which claims priority from Chinese Patent Application No. 201610719105.1 filed Aug. 25, 2016, all of which are hereby incorporated herein by reference.

TECHNICAL FIELD

The invention relates to a catalyst used in the field of water treatment, particularly a catalyst for catalytic oxidation treatment of organic wastewater, a preparation method and use thereof.

BACKGROUND OF THE INVENTION

The chlor-alkali industry is one of the important basic chemical industries in China, and it plays an important role in the rapid development of China's economy. However, the chlor-alkali industry is also relatively environmentally polluted. Since the chlor-alkali industry produces a large amount of alkaline wastewater containing sodium hypochlorite, the discharge of the alkaline wastewater not only causes a large amount of waste of water resources, but also causes great harm to the environment and human life. At the same time, some sodium hypochlorite solutions are used as industrial bleaches or disinfectants, and the discharged wastewater also contains a large amount of residual chlorine. However, with the increasing awareness of environmental protection in recent years, the pollution problem in the chlor-alkali industrial process and the environmental impact brought by its products have received much attention, and the discharge of alkaline wastewater containing sodium hypochlorite has also been strictly controlled.

At present, in the treatment scheme of wastewater containing sodium hypochlorite, the wastewater is mostly treated by catalytic decomposition. In the 1980s and 1990s, the Dow Chemical Company (U.S. Pat. No. 4,430,315), ICI (U.S. Pat. No. 5,041,408), Mineral Process Licensing Corp. (U.S. Pat. No. 5,039,429), PPG Industries (U.S. Pat. No. 4,297,333) and other companies had successively disclosed patent relating to catalysts and processes for promoting the decomposition of sodium hypochlorite. The catalysts involved all use VIII sub-group elements such as Co and Ni as the main active components, and have the crystal structure in which the spinel structure is the main active component. These patents all solve the problem of wastewater treatment by rapidly catalyzing the decomposition of sodium hypochlorite by a catalyst.

In recent years, domestic research has also been carried out in this field. For example, CN 102886268 B (Jiangsu Haipeng Anti-corrosion Equipments), CN 203639281 U (Jinchuan Group), CN 103801297 A (Zhejiang Titanium Alloy Instruments), CN 102626636 A (Hangzhou Zhonghuan Chemicals), CN 102698770 A (Zheng Yuan, etc.) and other patents disclose catalysts and processes for degrading sodium hypochlorite to sodium chloride and oxygen. However, these patents all focus on the catalytic decomposition treatment of sodium hypochlorite but fail to fully take into account and utilize the oxidizability of sodium hypochlorite.

At present, the treatment of organic wastewater, especially the organic wastewater difficult to be biochemically treated, is also a major problem. Among various treatment technologies, advanced oxidation technologies are mostly used, such as Fenton reagent method, ozone oxidation method, catalytic wet oxidation method (oxygen/air), and catalytic wetting hydrogen peroxide oxidation method, and the like. As pretreatment/treatment methods for wastewater difficult to be biochemically treated, these methods have good treatment effects, but these methods also have disadvantages of high treatment cost and high fixed investment, which severely limits their application. Chinese patent CN 104549316 A discloses a catalyst for catalytically oxidizing wastewater difficult to be biochemically treated with sodium hypochlorite and a preparation method thereof. The catalyst is prepared by impregnation method using $Al_2O_3$ as a carrier and V and/or W and Fe as active components; the specification thereof discloses that the catalyst is used for treating reverse osmosis concentrated water of wastewater from a refinery, and has a certain COD removing effect. However, it is apparent from the data of each example in the specification that the catalyst is only suitable for treating reverse osmosis concentrated water (organic wastewater) having a low COD value, and it does not provide related processing effects and data for the biochemical treatment of organic wastewater that has a high COD value.

Since sodium hypochlorite has oxidizability, if the oxidizability of sodium hypochlorite can be utilized by a catalyst to treat the organic wastewater and degrade the organic pollutants in the organic wastewater while decomposing the wastewater containing sodium hypochlorite, this will be a measure of "kill two birds with one stone, turning waste into treasure". CN 101844828 A of Nanjing University of Technology discloses a catalyst containing Ni as a main active component, and simply illustrates that the catalyst has the function of decomposing sodium hypochlorite and simultaneously degrading "a small amount of" contaminants in organic wastewater, but the ability of the catalyst to degrade contaminants in organic wastewater is not explicitly stated in the specification and examples.

SUMMARY OF THE INVENTION

The object of the present invention is to provide a catalyst for catalytic oxidation treatment of organic wastewater, which can effectively treat refractory organic pollutants in organic wastewater, and has a high COD removal rate.

The technical solutions of the present invention are as follows:

A catalyst for catalytic oxidation treatment of an organic wastewater, wherein the catalyst comprising alumina and nickel, iron, manganese and cerium loaded on the alumina in oxide form; based on the weight of the alumina, the contents of the following components in the catalyst are as follows:

nickel 5.0-20 wt %, preferably 5.5-12.0 wt %;
iron 0.5-5.5 wt %, preferably 1.5-5.0 wt %;
manganese 0.5-3.5 wt %, preferably 1.0-3.0 wt %;
cerium 1.5-3.0 wt %, preferably 2.0-2.8 wt %.

Nickel is the main active component, iron, manganese and cerium are used as modifiers (i.e., catalyst assistant) for modifying the performance of the catalyst and improving the catalytic effect of the catalyst. The modifier can also be other conventional modifiers used in the art.

Preferably, the catalyst comprises a cerium-modified alumina carrier and nickel, iron, manganese and cerium loaded on the cerium-modified alumina carrier in oxide form; the cerium-modified alumina carrier comprises alumina and cerium loaded on the alumina in oxide form; the cerium-modified alumina carrier having a cerium content of 1.0 to 2.0 wt %, preferably 1.2 to 1.5 wt %, based on the weight of the alumina.

Since the cerium-modified alumina carrier is obtained by loading cerium (the cerium is present in oxide form) on the alumina, the cerium-modified alumina carrier comprises alumina and cerium loaded on alumina in oxide form.

Since the catalyst is obtained by further loading nickel, iron, manganese and cerium (nickel, iron, manganese and cerium in oxide form) on the cerium-modified alumina carrier, the catalyst comprises a cerium-modified alumina carrier and nickel, iron, manganese and cerium loaded on the cerium-modified alumina carrier in oxide form.

Preferably, the amount of cerium loaded on the cerium-modified alumina carrier in the catalyst is 0.5-2.0 wt %, preferably 0.6-1.5 wt %, based on the weight of the alumina.

The content of cerium loaded on the cerium-modified alumina carrier in the catalyst refers to the content of cerium loaded on the cerium-modified alumina carrier when nickel, iron, manganese and cerium are further loaded on the cerium modified aluminium oxide carrier. The content of this part of cerium corresponds to the total content of cerium in the catalyst minus the cerium content of the cerium-modified alumina carrier.

When the carrier is a cerium-modified alumina carrier, cerium is present in two parts in the catalyst, and one part is present in the cerium-modified alumina carrier. The cerium in the cerium-modified alumina carrier is highly dispersed on the alumina to physically divide the inner surface of the alumina, and the cerium can form a strong interaction with the alumina to provide an anchoring effect; when the main active component and the modifiers are introduced, the cerium in the cerium-modified alumina carrier also provide a guiding effect to make the main active component evenly dispersed and prevent aggregation. The other part of the cerium is present in the load of the cerium-modified alumina carrier (i.e., the main active component and the modifier); due to the anchoring effect and guiding effect of cerium in the cerium-modified alumina carrier, the interaction force among the active component-cerium oxide-alumina in the catalyst (i.e., $NiO_x$—$CeO_2$—$Al_2O_3$, wherein $NiO_x$ is the oxide of the main active component on the catalyst, and x represents 2 or 3, since both $Ni^{2+}$ and $Ni^{3+}$ are present in $NiO_x$, in the oxide of the main active component, the atomic number of O is represented by x) is stronger than the interaction force in the active components-alumina ($NiO_x$—$Al_2O_3$). Therefore the aggregation and loss of the active components can be effectively reduced, which is especially suitable for the long-term treatment of wastewater that is difficult to be biochemically treated, and the catalyst has a good activity and treatment effect, and has a low operating treatment cost.

In addition, cerium has a good oxygen storage function. The active oxygen radicals generated by the oxidant on the main active component of the catalyst is the key to the degradation of organics. When the catalyst carrier is the cerium-modified alumina carrier and the catalyst catalyzes the oxidation of the oxidant (such as sodium hypochlorite), the active oxygen radicals generated by the oxidant on the main active component of the catalyst can migrate to the cerium of the cerium-modified alumina carrier in time for storage, so that the sites of the active oxygen radicals are increased, the reaction sites are increased, and the degradation rate and degradation amount of organics are increased.

For example, when the carrier of the catalyst is a cerium-modified alumina carrier and the oxidant is sodium hypochlorite, $ClO^-$ generates active oxygen radicals on $NiO_x$, and the structure of $NiO_x$—$CeO_2$—$Al_2O_3$ can timely migrate the active oxygen radicals generated on $NiO_x$ onto $CeO_2$, thereby the number of reaction sites is increased, the organics are effectively degraded, and the COD removal rate is improved. The catalytic oxidation mechanism thereof is as follows:

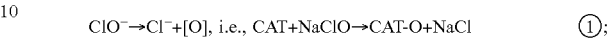

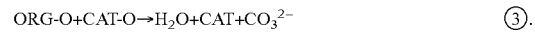

Wherein [O] represents active oxygen radicals, CAT represents a catalyst, ORG represents organics, CAT-O represents an active site on a catalyst, [O] is present at the active site, and ORG-O represents organics combined with [O]. Formula ① is a process in which sodium hypochlorite is catalytically catalyzed to produce [O] on the catalyst; Formula ② is a process in which a catalyst having an [O] active site is contacted with organics to transfer [O] to organics; Formula ③ is a process in which the organics combined with [O] degrades into small molecules or carbon dioxide and water under the action of a catalyst.

Preferably, the alumina has a particle size of 1.0-2.0 mm, preferably 1.5-2.0 mm; a bulk density of 0.30-0.50 g/ml, preferably 0.40-0.48 g/ml; a water absorption of 50-70 vol %, preferably 55-60 vol %; a specific surface area of 150-250 m²/g, preferably 180-220 m²/g; a pore volume of 1.2-1.8 ml/g, preferably 1.5-1.7 ml/g; a average pore diameter of 100-150 nm, preferably 130-145 nm.

Some organics which are difficult to be degraded in wastewater are usually macromolecules. The use of alumina with large pore volume and large pore size can provide proper pore channels, which are beneficial to the diffusion of macromolecular organics into the active sites inside the catalyst, to improve catalytic oxidation, and to be effective in degrading macromolecular organics.

Preferably, the nickel, iron, manganese and cerium are respectively derived from one or more of nitrates, acetates and carbonates containing corresponding metal elements, preferably nitrates.

A method for preparing the above catalyst, the preparation method comprising the following steps:

(1) adding the impregnation liquid of the cerium salt to the alumina, impregnating the alumina for 30-120 min, and then drying and calcining the obtained solid to obtain a cerium-modified alumina carrier;

(2) adding an impregnation liquid containing a nickel salt, an iron salt, a manganese salt and a cerium salt to the cerium-modified alumina carrier obtained in step (1), impregnating the cerium-modified alumina carrier for 30-120 minutes, and then drying and calcining the obtained solid to obtain the catalyst.

In the preparation method of the impregnation liquid containing the nickel salt, the iron salt, the manganese salt and the cerium salt in the above step (2), these salts can be added in any order, and the manganese salt and the cerium salt are preferably added to the solution prepared by using the nickel salt and the iron salt.

In the preparation method of the catalyst, the introduction of cerium adopts a "two-step method". In the first step, the cerium is introduced to modify the alumina and highly dispersed on the alumina to physically divide the inner surface of the alumina, and the cerium can form a strong interaction with alumina to provide an anchoring effect, and this part of cerium is present as part of the cerium-modified alumina carrier; in the second step, the cerium is introduced when introducing the carrier load (i.e., the main active component and the modifier). In the second step, the cerium introduced in the first step provides a guiding effect on the carrier load (i.e., the main active component and the modifier), so that the load, especially the main active component in the load, is dispersed evenly to prevent aggregation; due to the anchoring effect and guiding effect of the cerium introduced in the first step, the interaction force among the active component-cerium oxide-alumina ($NiO_x$—$CeO_2$—$Al_2O_3$) is stronger than the interaction force among the active component-alumina ($NiO_x$—$Al_2O_3$). Therefore, the aggregation and loss of active component can be effectively reduced, which is especially suitable for a long-period treatment of wastewater difficult to be biochemically treated, and the catalyst has a good activity and treatment effect and a low operating treatment cost.

Preferably, based on the weight of the alumina in the carrier, the content of cerium in the impregnation liquid of step (1) is 1.0-2.0 wt %, preferably 1.2-1.5 wt %; in the impregnation liquid of step (2), the content of cerium is 0.5-2.0 wt %, preferably 0.6-1.5 wt %; the content of nickel is 5.0-20 wt %, preferably 5.5-12.0 wt %; the content of iron is 0.5-5.5 wt %, preferably 1.5-5.0 wt %; the content of manganese is 0.5-3.5 wt %, preferably 1.0-3.0 wt %; the total content of cerium in the impregnation liquid of step (1) and step (2) is 1.5-3.0 wt %, preferably 2.0-2.8 wt %.

Preferably, in step (1), the drying temperature is 100-130° C., the drying time is 2-5 h, the calcining temperature is 450-550° C., and the calcining time is 3-6 h; in step (2), the drying temperature is 100-130° C., the drying time is 2-5 h, the calcining temperature is 450-550° C., and the calcining time is 3-6 h.

Preferably, in both steps (1) and (2), an equal volume impregnation process is used for impregnation.

Preferably, in step (1), a vacuum pretreatment is conducted to the alumina before the alumina impregnation; the vacuum pretreatment time is 10-30 min, and the vacuum degree of the vacuum pretreatment is 96.0-98.0 KPa.

Preferably, the solvent of the impregnation liquid in steps (1) and (2) is selected from the group consisting of water, methanol, ethanol and any combination thereof, preferably water and/or ethanol, more preferably an ethanol aqueous solution of having an ethanol concentration of 10-40 wt %.

In order to meet the requirements of equal volume impregnation process, the amount of solvent used can be determined according to the factors such as the amount of the corresponding metal salts, the amount of the carrier to be treated, the water absorption of the carrier to be treated, and the like.

Preferably, the cerium salt in step (1) and the nickel salt, the iron salt, the manganese salt and the cerium salt in step (2) are all one or more of nitrates, acetates and carbonates containing corresponding metal elements, preferably nitrates ($Ce(NO_3)_3$, $Ni(NO_3)_2$, $Fe(NO_3)_3$, $Mn(NO_3)_2$).

In the present invention, the alumina in the carrier can be alumina of any shape, such as a spherical shape, a cylindrical shape, a clover shape, a four-leaf clover shape, a gear spherical shape, and the like, preferably a spherical alumina.

Preferably, the spherical alumina is prepared according to the following steps:

(a) mixing aluminum foil with 7-15 wt % aqueous solution of HCl with an Al/Cl molar ratio of 1-3:1, stirring at 90-110° C. under reflux to dissolve the aluminum foil completely, to obtain an aluminum sol. The content of $Al_2O_3$ in the aluminum sol is 4-20 wt %;

(b) adding an aqueous solution of urotropine to the aluminum sol obtained in step (a), the amount of urotropine added is 35-70 wt % based on the weight of the $Al_2O_3$ contained in the aluminum sol, and after stirring evenly, dropping it into an oil column at 55-120° C. with a ball dropper, then forming and aging for 1-5 h; separating the pellets from the oil and transferring them to an aging kettle to continue the aging process at 110-180° C. for 6-18 h;

(c) rinsing the aged pellets with deionized water, drying at 120-150° C. for 2-6 h, then calcining at 550-650° C. for 4-10 h, and then treating the aged pellets with steam at 550-650° C. for 6-10 h to produce the spherical alumina.

Preferably, the aluminum foil has a purity greater than 99.9 wt %.

Preferably, the concentration of the aqueous solution of urotropine is 30-60% by weight, preferably 35-45% by weight, more preferably 40% by weight.

The invention also provides a use of the above catalyst for the treatment of organic wastewater.

The above catalyst is suitable for the treatment of organic wastewater known in the art, without particular limit on the COD content thereof, and is particularly suitable for the treatment of wastewater difficult to be biochemically treated. The wastewater difficult to be biochemically treated refers to organic wastewater which is difficult to be treated by biological methods, including refinery wastewater, printing and dyeing wastewater, coking wastewater, multi-effect evaporative concentrated water and multi-stage reverse osmosis device concentrated water, etc., preferably suitable for the wastewater difficult to be biochemically treated with a COD of 100-350 mg/L.

Preferably, the use refers to the use of sodium hypochlorite in the catalytic oxidation of organic wastewater.

Preferably, the organic wastewater has a pH of 7-8, the reaction temperature of the catalytic oxidation is 20-50° C., and the reaction time of the catalytic oxidation is 30-90 min.

The reaction time refers to the residence time of the wastewater in the reactor.

Preferably, the sodium hypochlorite as used is added to the organic wastewater in the form of "sodium hypochlorite solution", the concentration of the sodium hypochlorite solution is 3.0-10.0 wt %, and the dosage of sodium hypochlorite is determined according to the COD of the organic wastewater and the difficulty of degradation.

Preferably, the sodium hypochlorite as used is added to the organic wastewater in the form of "industrial wastewater containing sodium hypochlorite", thereby achieving the purpose of treating waste by waste. The "industrial wastewater containing sodium hypochlorite" includes chlor-alkali industrial wastewater, and other industrial wastewater containing sodium hypochlorite. The "industrial wastewater containing sodium hypochlorite" generally comprises the following components: NaClO with a content of 0.1-8.0 wt %, NaOH with a content of 0.1-2.0 wt %, $Na_2CO_3$ with a content of 0.1-8.0 wt %, and NaCl with a content of 0.1-3.0 wt %.

The beneficial effects of the invention lie in the follows:

(1) The catalyst of the invention has a good effect on degrading COD organic pollutants in waste water by catalytic oxidation, and the removal rate of COD organic pollutants is more than 80%, and the reaction activity is high.

(2) The modification to the carrier by cerium not only further enhances the catalytic activity of the catalyst, but also provides a strong interaction among $NiO_x$—$CeO_2$—$Al_2O_3$ due to the anchoring effect and guiding effect of cerium in the cerium-modified alumina carrier. Further, the active component is not easily aggregated and lost, and the activity and the low loss rate can be maintained during a long-term operation; the metal loss is controlled within 0.2 mg/L, the catalyst life is long, and the operation treatment cost is low.

(3) The industrial wastewater from chlor-alkali industry can be effectively treated, and the oxidation of a small amount of sodium hypochlorite contained in the chlor-alkali industrial wastewater can be fully utilized to achieve the treatment of refractory organic pollutants in organic wastewater, and the waste industrial wastewater containing sodium hypochlorite can be reused to achieve the purpose of treating waste by waste, which not only saves water but also has significant economic benefits.

EMBODIMENTS

The technical solutions of the present invention and the effects thereof will be further described below through specific embodiments. The following examples are merely illustrative of the invention and are not intended to limit the scope of the invention. Simple modifications of the invention are within the scope of the invention as claimed.

Example 1: Preparation of Spherical Alumina Carrier 30 g of high-purity aluminum foil (purity >99.9 wt %) were weighed, and 249.7 g of 10 wt % hydrochloric acid solution was added and stirred to dissolve the aluminum foil at 95-105° C. under reflux condition, and filtered to obtain a transparent aluminum sol with an alumina concentration of 18.2 wt %. 50 g of the obtained aluminum sol was weighed, and 12.0 g of urotropine aqueous solution containing 40% by weight of urotropine was added and mixed well, and then dropped into an oil column at 80° C. with a ball dropper to form pellets for 4-5 h; the pellets were separated from the oil and transferred to an aging kettle. After aging at 125° C. for 8 h, the pellets was taken out and rinsed with deionized water, dried at 120° C. for 2 h, then calcined at 600° C. for 6 h, and at last treated with steam at 600° C. for 8 h to obtain a spherical alumina carrier.

The physicochemical properties of the obtained spherical alumina carrier were as follows: particle size 1.2-1.8 mm, bulk density 0.43 g/ml, water absorption ratio 60 vol %, specific surface area 198 m$^2$/g, pore volume 1.42 ml/g, and average pore diameter 134 nm.

Example 2: Preparation of Cerium-Modified Alumina Carrier A 15 g (about 35 ml) of the spherical alumina carrier prepared in Example 1 was placed in a vacuum impregnation bottle for vacuum pretreatment, the vacuum pretreatment time was 30 min, and the vacuum degree was 98.0 KPa; 3.6 ml of cerium nitrate aqueous solution containing 0.05 g/ml of cerium was added to an ethanol aqueous solution having an ethanol concentration of 40 wt % to obtain 21 ml of impregnation liquid, and the impregnation liquid was added to the vacuum impregnation bottle and mixed evenly to perform an equal volume impregnation on the spherical alumina carrier. After impregnation for 60 min, the carrier was taken out and dried in an oven at 100° C. for 5 h, and then calcined at 450° C. for 6 h in a muffle furnace to obtain cerium-modified alumina carrier A.

In the obtained cerium-modified alumina carrier A, the content of cerium (Ce) was 1.2 wt % based on the weight of the alumina.

Example 3: Preparation of Cerium-Modified Alumina Carrier B 15 g (about 35 ml) of the spherical alumina carrier prepared in Example 1 was placed in a vacuum impregnation bottle for vacuum pretreatment. The vacuum pretreatment time was 10 min, and the vacuum degree was 96.0 KPa; 4.5 ml of cerium nitrate aqueous solution containing 0.05 g/ml of cerium was added to an ethanol aqueous solution having an ethanol concentration of 10 wt % to prepare 21 ml of impregnation liquid, and the impregnation liquid was added to the vacuum impregnation bottle and mixed evenly to perform an equal volume impregnation to the spherical alumina carrier. After impregnation for 120 min, the carrier was taken out and dried in an oven at 130° C. for 2 h, and then calcined at 550° C. for 3 h in a muffle furnace to obtain cerium-modified alumina carrier B.

In the obtained cerium-modified alumina carrier B, the content of cerium (Ce) was 1.5 wt % based on the weight of the alumina.

Example 4: Preparation of Cerium-Modified Alumina Carrier C 15 g (about 30 ml) of spherical alumina carrier from Shandong Yantai Baichuan Huitong Technology Co., Ltd. was taken and placed in a vacuum impregnation bottle for vacuum pretreatment. The vacuum pretreatment time was 20 min and the vacuum degree was 97.5 KPa. 6.0 ml of cerium nitrate aqueous solution containing 0.05 g/ml of cerium was taken and added to an ethanol aqueous solution have an ethanol concentration of 30 wt %, to prepare an impregnation liquid having a volume of 21 ml. The impregnation liquid was added to the vacuum impregnation bottle and mixed evenly to perform an equal volume impregnation on the spherical alumina carrier. After impregnation for 30 min, the carrier was taken out and dried in an oven at 120° C. for 3 h, and then calcined at 550° C. for 4 h in a muffle furnace to obtain cerium-modified alumina carrier C.

The physicochemical properties of the above spherical alumina carrier derived from Shandong Yantai Baichuan Huitong Technology Co., Ltd. were as follows: particle size 1.5-2.0 mm, bulk density 0.50 g/ml, water absorption rate 70 vol %, specific surface area 250 m$^2$/g, pore volume 1.20 ml/g, and average pore size 130 nm.

In the obtained cerium-modified alumina carrier C, the content of cerium (Ce) was 2.0 wt % based on the weight of the alumina.

Example 5: Preparation of Cerium-Modified Alumina Carrier D 15 g (about 50 ml) of spherical alumina carrier from Shandong Zibo Wufeng Aluminum Magnesium Co., Ltd. was taken and placed in a vacuum impregnation bottle for vacuum pretreatment, the vacuum pretreatment time was 30 min, and the vacuum degree was 98.0 KPa; 3.0 ml of cerium nitrate aqueous solution containing 0.05 g/ml of cerium was added to an ethanol aqueous solution having an ethanol concentration of 20 wt % to prepare an impregnation liquid having a volume of 25 ml, and the impregnation liquid was added to a vacuum impregnation bottle and mixed evenly to perform an equal volume impregnation on the spherical alumina carrier. After impregnation for 60 min, the carrier was taken out and dried in an oven at 120° C. for 2 h, and then calcined at 450° C. for 5 h in a muffle furnace to obtain cerium-modified alumina carrier D.

The physicochemical properties of the above spherical alumina carrier derived from Shandong Zibo Wufeng Aluminum Magnesium Co., Ltd. were as follows: particle size 1.0-1.5 mm, bulk density 0.30 g/ml, water absorption rate 50 vol %, specific surface area 150 m$^2$/g, pore volume 1.80 ml/g, average pore size of 150 nm.

In the obtained cerium-modified alumina carrier D, the content of cerium (Ce) was 1.0 wt % based on the weight of the alumina.

Example 6: Preparation of 1# Catalyst 15 g (about 35 ml) of cerium-modified alumina carrier A obtained in Example 2 was placed in a vacuum impregnation bottle for vacuum pretreatment. The vacuum pretreatment time was 30 min, and the vacuum degree was 97.5 KPa. At the same time, 10 ml of nickel nitrate aqueous solution containing 0.15 g/ml of nickel, 6.3 ml of iron nitrate aqueous solution containing 0.10 g/ml of iron, 1.0 ml of manganese nitrate aqueous solution containing 0.10 g/ml of manganese, and 2.4 ml of cerium nitrate aqueous solution containing 0.05 g/ml of cerium were added to an ethanol aqueous solution having an ethanol concentration of 40 wt % to prepare an impregnation liquid having a total volume of 21 ml. The above impregnation liquid was added to the vacuum impregnation bottle containing cerium-modified alumina carrier A and mixed evenly to perform an equal volume impregnation on the cerium-modified alumina carrier A. After impregnation for 30 min, the carrier was taken out and dried in an oven at 120° C. for 2 h, then calcined at 550° C. for 3 h in a muffle furnace.

In the obtained 1# catalyst, the contents of the following components were as follows: nickel 10.0 wt %, iron 4.2 wt %, manganese 0.7 wt %, and cerium 1.8 wt %, based on the weight of the alumina.

Example 6': Preparation of 1'# Catalyst 15 g (about 35 ml) of the spherical alumina carrier prepared in Example 1 was placed in a vacuum impregnation bottle and for vacuum pretreatment. The vacuum pretreatment time was 30 min, and the vacuum degree was 97.5 KPa. At the same time, 10 ml of nickel nitrate aqueous solution containing 0.15 g/ml of nickel, 6.3 ml of iron nitrate aqueous solution containing 0.10 g/ml of iron, 1.0 ml of manganese nitrate aqueous solution containing 0.10 g/ml of manganese, and 1.8 ml of cerium nitrate aqueous solution containing 0.15 g/ml of cerium were added to an ethanol aqueous solution having an ethanol concentration of 40 wt % to prepare an impregnation liquid having a total volume of 21 ml. The above impregnation liquid was added to the vacuum impregnation bottle containing the spherical alumina carrier and mixed evenly to perform an equal volume impregnation on the spherical alumina carrier. After impregnation for 30 min, the carrier was taken out and placed in an oven at 120° C. for 2 h, then calcined in a muffle furnace at 550° C. for 3 h.

In the obtained 1'# catalyst, based on the weight of the alumina, the contents of the following components therein were as follows: nickel 10.0 wt %, iron 4.2 wt %, manganese 0.7 wt %, and cerium 1.8 wt %.

Comparison of the effects of the first group of catalysts with prior art catalysts:

Reverse osmosis concentrated water (COD: 298 ppm, pH=7.8) re-concentrated by a reverse osmosis device was taken, then a sodium hypochlorite solution having a concentration of 10 wt % was added thereto, and the addition amount was 7 ml of the sodium hypochlorite solution per liter of the reverse osmosis concentrated water. The mixed solution was divided into four parts and processed through 1# reactor, 2# reactor, 3# reactor and 4# reactor respectively, wherein 1# reactor was loaded with 1# catalyst prepared in Example 6, 2# reactor was loaded with 1'# catalyst prepared in Example 6', #3 reactor was loaded with the catalyst of Example 1 in CN 101844828 B, and #4 reactor was loaded with the catalyst of Example 1 in CN 104549316 A. The dosage of each catalyst was 2 L, the residence time in the reactors was 1 h, the amount of influent water was 2 L/h, and the treatment temperature was 40° C.

The reverse osmosis concentrated water (COD: 298 ppm, pH=7.8) re-concentrated in the reverse osmosis device was taken, then chlor-alkali industrial wastewater was added thereto (the chlor-alkali industrial wastewater contained the following components: NaClO with a content of 4.8 wt %; NaOH with content of 1.5 wt %; Na$_2$CO$_3$ with a content of 7.0 wt %; NaCl with a content of 0.8 wt %), and the addition amount was 14.6 ml of the above-mentioned chlor-alkali industrial wastewater per liter of the reverse osmosis concentrated water. The mixed solution was divided into four parts and processed through 5# reactor, 6# reactor, 7# reactor and 8# reactor respectively, wherein 5# reactor was loaded with 1# catalyst prepared in Example 6, and 6# reactor was loaded with 1'# catalyst prepared in Example 6', and #7 reactor was loaded with the catalyst of Example 1 in CN 101844828 B, and #8 reactor was loaded with the catalyst of Example 1 in CN 104549316 A. The dosage of each catalyst was 2 L, the residence time in the reactors was 1 h, the amount of influent water was 2 L/h, and the treatment temperature was 40° C.

The comparison results of the effects of the catalysts in the first group are shown in Table 1.

TABLE 1

Comparison results of the catalysts in the first group

| Reactor | Catalyst | Oxidant | COD of the influent water (ppm) | COD of the effluent water (ppm) | COD removal rate (%) | Metal loss amount in the effluent water (mg/L) |
|---|---|---|---|---|---|---|
| 1# | 1# (two-step method) | sodium hypochlorite solution | 298 | 48 | 84 | 0.1 |
| 2# | 1'# (one step method) | | 298 | 87 | 71 | 0.5 |
| 3# | CN 101844828 B | | 298 | 206 | 31 | 0.5 |
| 4# | CN 104549316 A | | 298 | 150 | 50 | 0.4 |
| 5# | 1# (two-step method) | chlor-alkali industrial wastewater | 298 | 45 | 85 | 0.1 |
| 6# | 1'# (one step method) | | 298 | 83 | 72 | 0.4 |
| 7# | CN 101844828 B | | 298 | 200 | 33 | 0.4 |
| 8# | CN 104549316 A | | 298 | 143 | 52 | 0.4 |

The metal loss amount in the effluent water refers to the content of metal which is from the catalyst and discharged with the effluent water when the wastewater was treated, in mg/L.

Example 7: Preparation of 2# Catalyst 15 g (about 50 ml) of cerium-modified alumina carrier D obtained in Example 5 was placed in a vacuum impregnation bottle for vacuum pretreatment. The vacuum pretreatment time was 30 min, and the vacuum degree was 96.0 KPa. At the same time, 12 ml of nickel nitrate aqueous solution containing 0.15 g/ml of nickel, 2.3 ml of iron nitrate aqueous solution containing 0.10 g/ml of iron, 3.0 ml of manganese nitrate aqueous solution containing 0.10 g/ml of manganese, and 1.5 ml of cerium nitrate aqueous solution containing 0.05 g/ml of cerium were added to an ethanol aqueous solution having an ethanol concentration of 10 wt % to prepare an impregnation liquid having a total volume of 25 ml. The above impregnation liquid was added to the vacuum impregnation bottle containing cerium-modified alumina carrier D and mixed evenly to perform an equal volume impregnation on cerium-modified alumina carrier D. After impregnation for 120 minutes, the carrier was taken out and dried in an oven at 110° C. for 3 h, then calcined at 500° C. for 6 h in a muffle furnace.

In the obtained 2# catalyst, based on the weight of alumina, the content of each component was as follows: nickel 12.0 wt %, iron 1.5 wt %, manganese 2.0 wt %, and cerium 1.5 wt %.

Example 7': Preparation of 2'# Catalyst 15 g (about 50 ml) of the spherical alumina carrier from Shandong Zibo Wufeng Aluminum Magnesium Co., Ltd. was placed in a vacuum impregnation bottle for vacuum pretreatment. The vacuum pretreatment time was 30 min and the vacuum degree was 96.0 KPa. At the same time, 12 ml of nickel nitrate aqueous solution containing 0.15 g/ml of nickel, 2.3 ml of iron nitrate aqueous solution containing 0.10 g/ml of iron, 3.0 ml of manganese nitrate aqueous solution containing 0.10 g/ml of manganese, and 1.5 ml of cerium nitrate aqueous solution containing 0.15 g/ml of cerium were added to an ethanol aqueous solution having an ethanol concentration of 10 wt % to prepare an impregnation liquid having a total volume of 25 ml. The above impregnation liquid was added to the vacuum impregnation bottle containing the spherical alumina carrier and mixed evenly to perform an equal volume impregnation on the spherical alumina carrier. After impregnation for 120 min, the carrier was taken out and placed in an oven at 110° C. for 3 h, and then calcined in a muffle furnace was at 500° C. for 6 h.

In the obtained 2'# catalyst, based on the weight of alumina, the content of each component was as follows: nickel 12.0 wt %, iron 1.5 wt %, manganese 2.0 wt %, and cerium 1.5 wt %.

Comparison of the effects of the catalysts of second group with the catalysts of prior art:

Reverse osmosis concentrated water (COD 224 ppm, pH=7.2) re-concentrated by a reverse osmosis device was taken, and a sodium hypochlorite solution having a concentration of 10 wt % was added to the reverse osmosis concentrated water, and the addition amount was 5.2 ml of the above sodium hypochlorite solution per liter of the reverse osmosis concentrated water. The mixed solution was divided into four parts and processed through 1# reactor, 2# reactor, 3# reactor and 4# reactor respectively, wherein 1# reactor was loaded with 2# catalyst prepared in Example 7, 2# reactor was loaded with 2'# catalyst prepared in Example 7', #3 reactor was loaded with the catalyst of Example 1 in CN 101844828 B, and #4 reactor was loaded with the catalyst of Example 1 in CN 104549316 A. The dosage of each catalyst was 2 L, the residence time in the reactors was 1 h, the amount of influent water was 2 L/h, and the treatment temperature was 20° C.

The reverse osmosis concentrated water (COD: 224 ppm, pH=7.2) re-concentrated by the reverse osmosis device was taken, then chlor-alkali industrial wastewater was added thereto (the chlor-alkali industrial wastewater contained the following components: NaClO with a content of 5.8 wt %; NaOH with a content of 1.1 wt %; $Na_2CO_3$, content was 7.3 wt %; NaCl, the content was 1.2 wt %), and the addition amount was 9.0 ml of the above chlor-alkali industrial wastewater per liter of the reverse osmosis concentrated water. The mixed solution was divided into four parts and processed through 5# reactor, 6# reactor, 7# reactor and 8# reactor respectively, wherein 5# reactor was loaded with 2# catalyst prepared in Example 7, 6# reactor was loaded with 2'# catalyst prepared in Example 7', 7# reactor was loaded with the catalyst of Example 1 in CN 101844828 B, and 8# reactor was loaded with the catalyst of Example 1 in CN 104549316 A. The dosage of each catalyst was 2 L, the residence time in the reactors was 1 h, the amount of influent water was 2 L/h, and the treatment temperature was 20° C.

The comparison results of the effects of the catalysts of the second group were shown in Table 2.

TABLE 2

Comparison results of the catalysts of the second group

| Reactor | Catalyst | Oxidant | COD of the influent water (ppm) | COD of the effluent water (ppm) | COD re-moval rate (%) | Metal loss amount in the effluent water (mg/L) |
|---|---|---|---|---|---|---|
| 1# | 2# (two-step method) | sodium hypo-chlorite solution | 224 | 43 | 81 | 0.2 |
| 2# | 2'# (one step method) | | 224 | 60 | 73 | 0.5 |
| 3# | CN 101844828 B | | 224 | 141 | 37 | 0.4 |
| 4# | CN 104549316 A | | 224 | 94 | 58 | 0.3 |
| 5# | 2# (two-step method) | chlor-alkali industrial waste-water | 224 | 35 | 84 | 0.2 |
| 6# | 2'# (one step method) | | 224 | 54 | 76 | 0.4 |
| 7# | CN 101844828 B | | 224 | 135 | 40 | 0.3 |
| 8# | CN 104549316 A | | 224 | 90 | 60 | 0.3 |

Example 8: Preparation of 3# Catalyst 15 g (about 35 ml) of cerium-modified alumina carrier B obtained in Example 3 was placed in a vacuum impregnation bottle for vacuum pretreatment. The vacuum pretreatment time was 30 min, and the vacuum degree was 97.0 KPa. At the same time, 6.0 ml of nickel nitrate aqueous solution containing 0.15 g/ml of nickel, 7.5 ml of iron nitrate aqueous solution containing 0.10 g/ml of iron, 2.5 ml of manganese nitrate aqueous solution containing 0.18 g/ml of manganese, and 3.9 ml of the cerium nitrate aqueous solution containing 0.05 g/ml of cerium were added to deionized water to prepare an impregnation liquid having a total volume of 21 ml. The above impregnation liquid was added to the vacuum impregnation bottle containing cerium-modified alumina carrier B and mixed evenly to perform an equal volume impregnation on cerium-modified alumina carrier B. After impregnation for 90 minutes, the carrier was taken out and placed in an oven at 130° C. to dry for 2 h, then calcined at 550° C. for 5 h in a muffle furnace.

In the obtained #3 catalyst, based on the weight of the alumina, the content of each component was as follows: nickel 6.0 wt %, iron 5.0 wt %, manganese 3.0 wt %, and cerium 2.8 wt %.

Example 8': Preparation of 3'# Catalyst 15 g (about 35 ml) of the spherical alumina carrier prepared in Example 1 was placed in a vacuum impregnation bottle for vacuum pretreatment. The vacuum pretreatment time was 30 min, and the vacuum degree was 97.0 KPa. At the same time, 6 ml of nickel nitrate aqueous solution containing 0.15 g/ml of nickel, 7.5 ml of iron nitrate aqueous solution containing 0.10 g/ml of iron, 2.5 ml of manganese nitrate aqueous solution containing 0.18 g/ml of manganese, and 2.8 ml of cerium nitrate aqueous solution containing 0.15 g/ml of cerium were added to deionized water to prepare an impregnation liquid having a total volume of 21 ml. The above impregnation liquid was added to the vacuum impregnation bottle containing the spherical alumina carrier and mixed evenly to perform an equal volume impregnation on the spherical alumina carrier. After impregnation for 90 min, the carrier was taken out and placed in an oven at 130° C. for 2 h, then calcined in a muffle furnace was at 550° C. for 5 h.

In the obtained 3'# catalyst, based on the weight of alumina, the content of each component was as follows: nickel 6.0 wt %, iron 5.0 wt %, manganese 3.0 wt %, and cerium 2.8 wt %.

Comparison of the effects of the catalysts of the third group with the catalysts of the prior art:

Reverse osmosis concentrated water (COD: 183 ppm, pH=7.6) re-concentrated by a reverse osmosis device was taken, then a sodium hypochlorite solution having a concentration of 10 wt % was added thereto, and the addition amount was 4.3 ml of the sodium hypochlorite solution per liter of the reverse osmosis concentrated water. The mixed solution was divided into four parts and processed through 1# reactor, 2# reactor, 3# reactor and 4# reactor respectively, wherein 1# reactor was loaded with 3# catalyst prepared in Example 8, 2# reactor was loaded with 3'# catalyst prepared in Example 8', and 3# reactor was loaded with the catalyst of Example 1 in CN 101844828 B, and the 4# reactor was loaded with the catalyst of Example 1 in CN 104549316 A. The dosage of each catalyst was 2 L, the residence time in the reactors was 1 h, the amount of influent water was 2 L/h, and the treatment temperature was 50° C.

The reverse osmosis concentrated water (COD was 183 ppm, pH=7.6) re-concentrated by the reverse osmosis device, then the chlor-alkali industrial wastewater was added thereto (the chlor-alkali industrial wastewater contained the following components: NaClO with a content of 4.6 wt %; NaOH with a content of 1.3 wt %; $Na_2CO_3$ with a content of 6.5 wt %; NaCl with a content of 1.0 wt %), and the addition amount was 9.3 ml of the above chlor-alkali industrial wastewater per liter of the reverse osmosis concentrated water. The mixed solution was divided into four parts and processed through 5# reactor, 6# reactor, 7# reactor and 8# reactor, wherein 5# reactor was loaded with 3# catalyst prepared in Example 8, 6# reactor was loaded with 3'# catalyst prepared in Example 8', 7# reactor was loaded with the catalyst of Example 1 in CN 101844828 B, and 8# reactor was loaded with the catalyst of Example 1 in CN 104549316 A. The dosage of each catalyst was 2 L, the residence time in the reactors was 1 h, the amount of influent water was 2 L/h, and the treatment temperature was 50° C.

The comparison results of the effects of the catalysts of the third group are shown in Table 3.

TABLE 3

Comparison results of the catalysts of the third group

| Reactor | Catalyst | Oxidant | COD of the influent water (ppm) | COD of the effluent water (ppm) | Removal rate of COD (%) | Metal loss amount in the effluent water (mg/L) |
|---|---|---|---|---|---|---|
| 1# | 3# (two-step method) | Sodium hypochlorite solution | 183 | 27 | 85 | 0.1 |
| 2# | 3'# (one step method) | | 183 | 53 | 71 | 0.4 |
| 3# | CN 101844828 B | | 183 | 106 | 42 | 0.4 |
| 4# | CN 104549316 A | | 183 | 84 | 54 | 0.2 |
| 5# | 3# (two-step method) | chlor-alkali industrial wastewater | 183 | 31 | 83 | 0.2 |
| 6# | 3'# (one step method) | | 183 | 54 | 70 | 0.5 |
| 7# | CN 101844828 B | | 183 | 112 | 39 | 0.4 |
| 8# | CN 104549316 A | | 183 | 91 | 50 | 0.1 |

Example 9: Preparation of 4# Catalyst 15 g (about 30 ml) of cerium-modified alumina carrier C obtained in Example 4 was placed in a vacuum impregnation bottle for vacuum pretreatment. The vacuum pretreatment time was 30 min, and the vacuum degree was 98.0 KPa. At the same time, 16.0 ml of nickel nitrate aqueous solution containing 0.15 g/ml of nickel, 0.9 ml of iron nitrate aqueous solution containing 0.10 g/ml of iron, 0.8 ml of manganese nitrate aqueous solution containing 0.18 g/ml of manganese, and 1.0 ml of cerium nitrate aqueous solution containing 0.15 g/ml of cerium were added to deionized water to prepare an impregnation liquid having a total volume of 21 ml. The above impregnation liquid was added to the vacuum impregnation bottle containing cerium-modified alumina carrier C and mixed evenly to perform an equal volume impregnation on the cerium-modified alumina carrier C. After impregnation for 60 minutes, the carrier was taken out and placed in an oven at 130° C. to dry for 2 h, then calcined in a muffle furnace at 480° C. for 6 h.

In the obtained #4 catalyst, based on the weight of the alumina, the content of each component was as follows: nickel 16.0 wt %, iron 0.6 wt %, manganese 1.0 wt %, and cerium 3.0 wt %.

Example 9': Preparation of 3'# Catalyst 15 g (about 30 ml) of the spherical alumina carrier from Shandong Yantai Baichuan Huitong Technology Co., Ltd. was taken and placed in a vacuum impregnation bottle for vacuum pretreatment. The vacuum pretreatment time was 30 min and the vacuum degree was 98.0 KPa. At the same time, 16.0 ml of nickel nitrate aqueous solution containing 0.15 g/ml of nickel, 0.9 ml of iron nitrate aqueous solution containing 0.10 g/ml of iron, 0.8 ml of manganese nitrate aqueous solution containing 0.18 g/ml of manganese, and 3.0 ml of cerium nitrate aqueous solution containing 0.15 g/ml of cerium were added to deionized water to prepare an impregnation liquid having a total volume of 21 ml. The above impregnation liquid was added to the vacuum impregnation bottle containing the spherical alumina carrier and mixed evenly to perform an equal volume impregnation on the spherical alumina carrier. After impregnation for 60 min, the carrier was taken out and placed in an oven at 130° C. for 2 h, and then calcined in a muffle furnace at 480° C. for 6 h.

In the obtained 3-1# catalyst, based on the weight of alumina, the content of each component was as follows: nickel 16.0 wt %, iron 0.6 wt %, manganese 1.0 wt %, and cerium 3.0 wt %.

Comparison of the effects of the catalysts of the fourth group with the catalysts of the prior art:

Reverse osmosis concentrated water (COD 240 ppm, pH=7.9) re-concentrated by a reverse osmosis device was taken, then a sodium hypochlorite solution having a concentration of 3.0 wt % was added thereto, and the addition amount was 18.7 ml of the sodium hypochlorite solution per liter of the reverse osmosis concentrated water. The mixed solution was divided into four parts and processed through 1# reactor, 2# reactor, 3# reactor and 4# reactor, wherein 1# reactor was loaded with 4# catalyst prepared in Example 9, 2# reactor was loaded with 4'# catalyst prepared in Example 9', 3# reactor was loaded with the catalyst of Example 1 in CN 101844828 B, and 4# reactor was loaded with the catalyst of Example 1 in CN 104549316 A. The dosage of each catalyst was 2 L, the residence time in the reactors was 1 h, the amount of influent water was 2 L/h, and the treatment temperature was 40° C.

The reverse osmosis concentrated water (COD 240 ppm, pH=7.9) re-concentrated by the reverse osmosis device was taken, and chlor-alkali industrial wastewater was added thereto (the chlor-alkali industrial wastewater contained the following components: NaClO with a content of 3.6 wt %; NaOH with a content of 1.0 wt %; $Na_2CO_3$, with a content of 7.3 wt %; NaCl with a content of 1.6 wt %), and the addition amount was 15.6 ml of the above chlor-alkali industrial wastewater per liter of the reverse osmosis concentrated water. The mixed solution was divided into four parts and processed through 5# reactor, 6# reactor, 7# reactor and 8# reactor, wherein 5# reactor was loaded with 4# catalyst prepared in Example 9, 6# reactor was loaded with 4'# catalyst prepared in Example 9', and 7# reactor was loaded with the catalyst of Example 1 in CN 101844828 B, and 8# reactor was loaded with the catalyst of Example 1 in CN 104549316 A. The dosage of each catalyst was 2 L, the residence time in the reactors was 1 h, the amount of influent water was 2 L/h, and the treatment temperature was 40° C.

The comparison results of the effects of the catalysts of the fourth group are shown in Table 4.

TABLE 4

Comparison results of the catalysts of the fourth group

| Reactor | Catalyst | Oxidant | COD of the influent water (ppm) | COD of the effluent water (ppm) | Removal rate of COD (%) | Metal loss amount in the effluent water (mg/L) |
|---|---|---|---|---|---|---|
| 1# | 4# (two-step method) | sodium hypochlorite solution | 240 | 47 | 80 | 0.1 |
| 2# | 4'# (one step method) | | 240 | 70 | 71 | 0.5 |
| 3# | CN 101844828 B | | 240 | 130 | 46 | 0.3 |
| 4# | CN 104549316 A | | 240 | 96 | 60 | 0.1 |
| 5# | 4# (two-step method) | chlor-alkali industrial wastewater | 240 | 36 | 85 | 0.1 |
| 6# | 4'# (one step method) | | 240 | 62 | 74 | 0.3 |
| 7# | CN 101844828 B | | 240 | 122 | 49 | 0.4 |
| 8# | CN 104549316 A | | 240 | 89 | 63 | 0.2 |

Base on the comparison results of the effects of the catalysts of the above four groups, comparing with the catalysts in the prior art, the catalysts of the present invention can effectively catalyze the oxidation of sodium hypochlorite, thereby effectively degrade the refractory organic pollutants in the organic wastewater. The treatment effect on the organic wastewater is good. The removal rate of COD is high, and the amount of metal loss in the effluent water is small. Among the catalysts with same components and contents of each component, compared with the carrier which is a simple spherical alumina carrier, the carrier which is a cerium modified alumina carrier has a better treatment effect on the organic wastewater, higher the removal rate of COD, and small metal loss in the effluent water, which fully demonstrates that the cerium in the cerium-modified alumina carrier can provide an anchoring effect and dispersing effect, prevent the loss of active metal components, and improve the treatment effect on organic wastewater. Similarly, the catalyst of the present invention can effectively catalyze the oxidation of sodium hypochlorite in industrial wastewater containing sodium hypochlorite (such as chlor-alkali industrial wastewater), and then treat the organic wastewater to achieve the purpose of treating waste by waste and saving resources.

The invention claimed is:

1. A preparation method of a catalyst for catalytic oxidation treatment of organic wastewater, wherein the preparation method comprises the following steps:
    (1) adding an impregnation liquid of cerium salt to the alumina, impregnating the alumina for 30-120 min, and then drying and calcining the obtained solid to produce a cerium-modified alumina carrier;
    (2) adding an impregnation liquid containing a nickel salt, an iron salt, a manganese salt and a cerium salt to the cerium-modified alumina carrier obtained in step (1), impregnating the cerium-modified alumina carrier for 30-120 minutes, and then drying and calcining the obtained solid to produce the catalyst;
    based on the weight of the alumina, the cerium content in the impregnation liquid of step (1) is 1.0-2.0 wt %; in the impregnation liquid of step (2), the cerium content is 0.5-2.0 wt %; the nickel content is 5.0-20 wt %; the iron content is 0.5-5.5 wt %; the manganese content is 0.5-3.5 wt %; the total cerium content in the impregnation liquid of step (1) and step (2) is 1.5-3.0 wt %;

wherein the catalyst prepared by said preparation method comprises a cerium-modified alumina carrier and nickel, iron, manganese and cerium loaded on the cerium-modified alumina carrier in oxide form: based on the weight of the alumina, the contents of the following components in the catalyst are as follows:
nickel 5.0-20 wt %;
iron 0.5-5.5 wt %;
manganese 0.5-3.5 wt %;
cerium 1.5-3.0 wt %;
wherein in step (1) the cerium-modified alumina carrier comprises alumina and cerium loaded on the alumina in oxide form and based on the weight of the alumina, the cerium content of the cerium-modified alumina carrier is 1.0-2.0 wt %;
wherein based on the weight of the alumina, the content of cerium loaded on the cerium-modified alumina carrier in the catalyst in step (2) is 0.5-2.0 wt %.

2. The preparation method according to claim 1, wherein in step (1), the drying temperature is 100-130° C., the drying time is 2-5 h, the calcining temperature is 450-550° C., and the calcining time is 3-6 h; in step (2), the drying temperature is 100-130° C., the drying time is 2-5 h, the calcining temperature is 450-550° C., and the calcining time is 3-6 h.

3. The preparation method according to claim 2, wherein an equal volume impregnation process is used in both steps (1) and (2) for impregnation.

4. The preparation method according to claim 1, wherein in step (1), a vacuum pretreatment to the alumina is conducted before the impregnation; the vacuum pretreatment time is 10-30 min, and the vacuum degree of the vacuum pretreatment is 96.0-98.0 KPa.

5. The preparation method according to claim 4, wherein the solvent of the impregnation liquid in steps (1) and (2) is selected from the group consisting of water, methanol, ethanol and any combination thereof.

6. The preparation method according to claim 5, wherein the solvent of the impregnation liquid in steps (1) and (2) is selected from water and/or ethanol.

7. The preparation method according to claim 5, wherein the solvent of the impregnation liquid in steps (1) and (2) is selected from an ethanol aqueous solution having an ethanol concentration of 10-40% by weight.

8. The preparation method according to claim 1, wherein the cerium salt in step (1) and the nickel salt, iron salt, manganese salt and cerium salt in step (2) are all one or more of nitrates, acetates or carbonates containing corresponding metal elements.

9. The preparation method according to claim 8, wherein the cerium salt in step (1) and the nickel salt, iron salt, manganese salt and cerium salt in step (2) are all nitrates containing corresponding metal elements.

10. A method for treating organic wastewater, comprising adding the catalyst prepared by the preparation method according to claim 1 to organic wastewater.

11. The method according to claim 10, wherein comprising further adding sodium hypochlorite to treat the organic wastewater by catalytic oxidation.

12. The method according to claim 11, wherein the pH of the organic wastewater is 7-8, the reaction temperature of the catalytic oxidation is 20-50° C., and the reaction time is 30-90 min.

13. The preparation method according to claim 1, wherein based on the weight of the alumina, the contents of the following components in the catalyst are as follows:
nickel 5.5-12.0 wt %;
iron 1.5-5.0 wt %;
manganese 1.0-3.0 wt %;
cerium 2.0-2.8 wt %.

14. The preparation method according to claim 1, wherein in step (1) based on the weight of the alumina, the cerium content of the cerium-modified alumina carrier is 1.2-1.5 wt %.

15. The preparation method according to claim 1, wherein based on the weight of the alumina, the content of cerium loaded on the cerium-modified alumina carrier in the catalyst in step (2) is 0.6-1.5 wt %.

16. The preparation method according to claim 1, wherein based on the weight of the alumina, the cerium content in the impregnation liquid of step (1) is 1.2-1.5 wt %; in the impregnation liquid of step (2), the cerium content is 0.6-1.5 wt %; the nickel content is 5.5-12.0 wt %; the iron content is 1.5-5.0 wt %; the manganese content is 1.0-3.0 wt %; the total cerium content in the impregnation liquid of step (1) and step (2) is 2.0-2.8 wt %.

* * * * *